United States Patent [19]
Mersch

[11] Patent Number: 5,008,556
[45] Date of Patent: Apr. 16, 1991

[54] MEASURING A GAP BETWEEN A TUBE AND A FLOAT

[75] Inventor: Steven H. Mersch, Germantown, Ohio

[73] Assignee: Becton, Dickinson and Company, Franklin Lakes, N.J.

[21] Appl. No.: 383,786

[22] Filed: Jul. 24, 1989

[51] Int. Cl.$^5$ .................... G01N 21/86; G01B 11/00
[52] U.S. Cl. .................................. 250/560; 250/577; 356/372
[58] Field of Search ............... 250/573, 574, 575, 576, 250/577, 560, 561, 225; 356/372, 381, 128; 33/700

[56] References Cited

U.S. PATENT DOCUMENTS

| | | | |
|---|---|---|---|
| 3,636,360 | 1/1972 | Oishi et al. | 250/577 |
| 3,787,703 | 1/1974 | Topol | 250/576 |
| 4,182,259 | 1/1980 | Garner et al. | 250/577 |
| 4,366,384 | 12/1982 | Jensen | 250/575 |
| 4,654,535 | 3/1987 | Wolske | 250/577 |
| 4,762,518 | 8/1988 | Kreinick | 250/577 |
| 4,857,050 | 8/1989 | Lentz et al. | 250/577 |
| 4,859,861 | 8/1989 | Mersch | 250/560 |
| 4,859,864 | 8/1989 | Smith | 250/577 |

Primary Examiner—David C. Nelms
Assistant Examiner—Michael Messinger
Attorney, Agent, or Firm—Aaron Passman

[57] ABSTRACT

An apparatus or method determines the gap between an assembly of a tube and a cylindrical float located substantially concentric to the tube. An elliptically polarized light beam at the wavelength for which the materials of the tube and the gap are transparent or translucent is along an optical axis. The index of refraction of the tube and float materials are greater than the index of refraction of the gap material. Means translates and rotates the assembly along and about its longitudinal axis producing an illumination. A light filtering means along the optical axis beyond the assembly blocks light of the illumination reflected by the assembly and refracted by the tube, the gap between the tube, and the float and the float and transmits light of the illumination refracted by the tube and the gap between tube and float. Light detection means receives transmitted light and signals a signal processing means. The method has steps of transmitting the monochromatic beam of elliptically polarized light along the optical axis to the assembly, focusing the beam of light, translating and rotating the assembly through the light, producing an illumination, filtering the illumination by blocking illumination reflected by the assembly and refracted by the float, the tube and the gap between the tube and the float and transmitting the illumination refracted by the tube and the gap between the tube and the float.

17 Claims, 4 Drawing Sheets

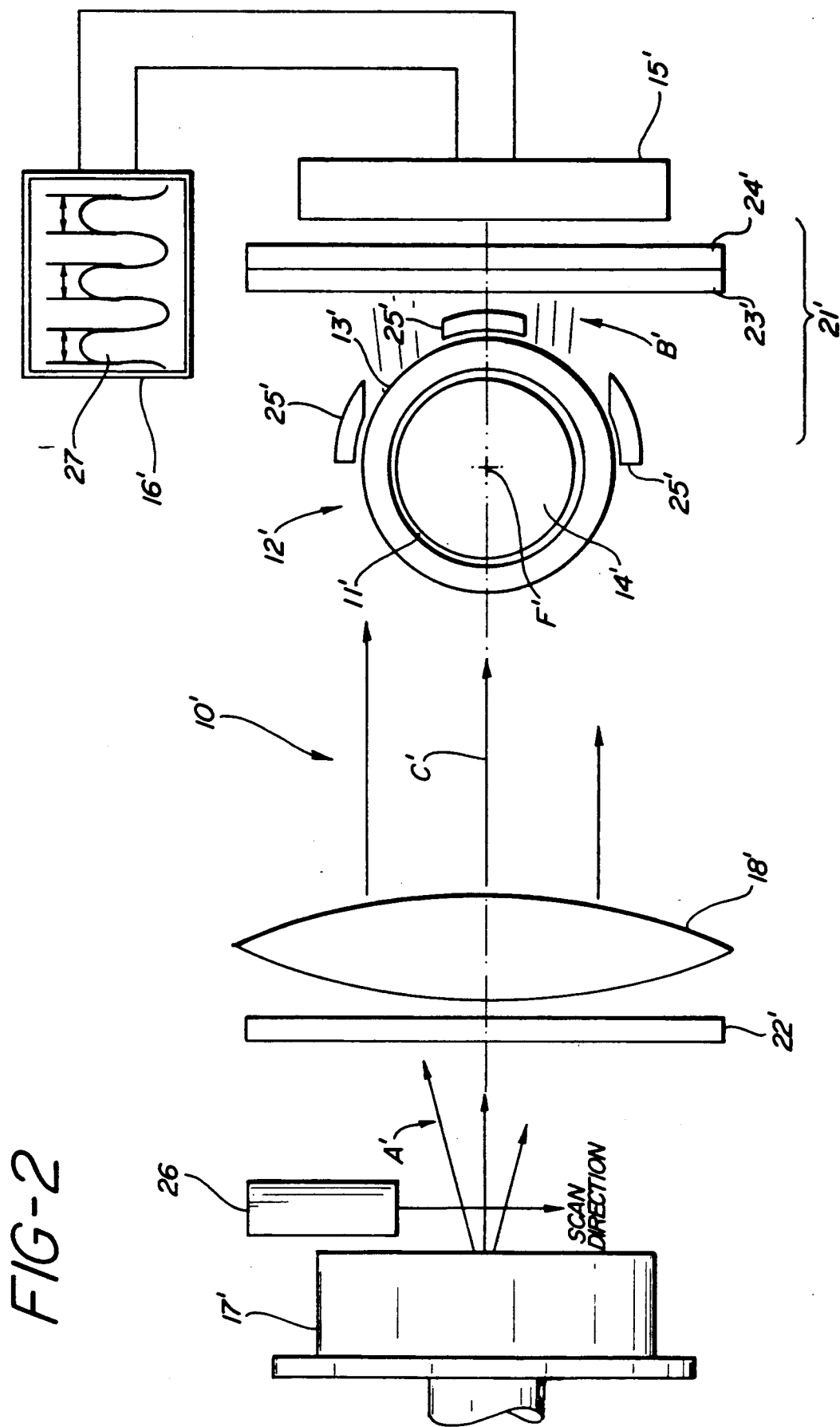

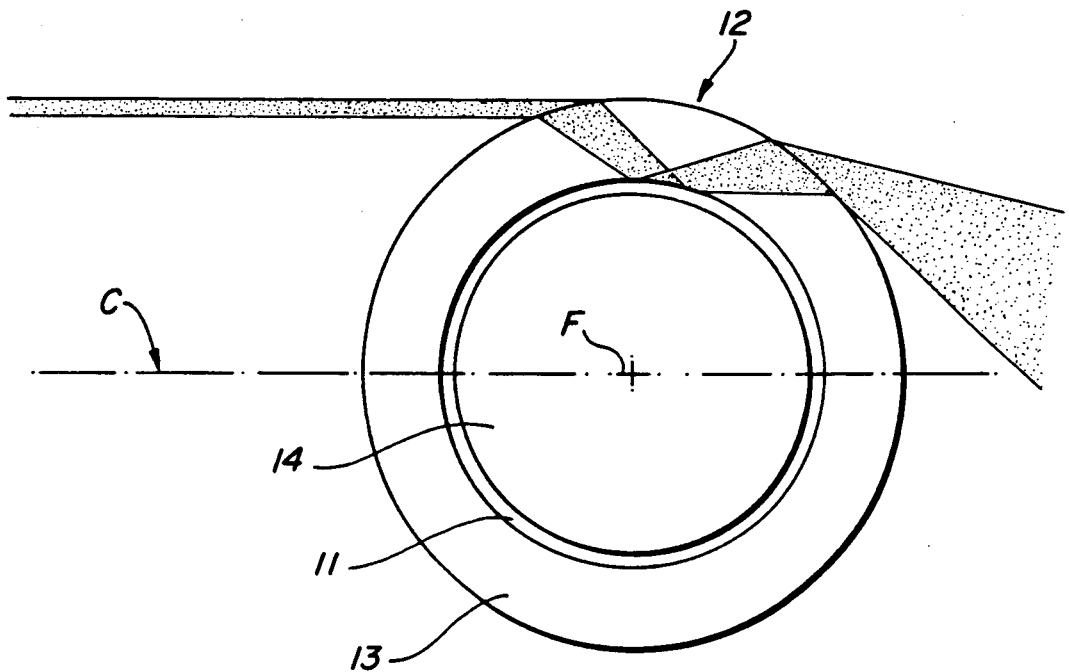
FIG-3 RAY TRACE OF LIGHT TOTAL INTERNALLY REFLECTED BY INTERFACE AT THE TUBE AND GAP
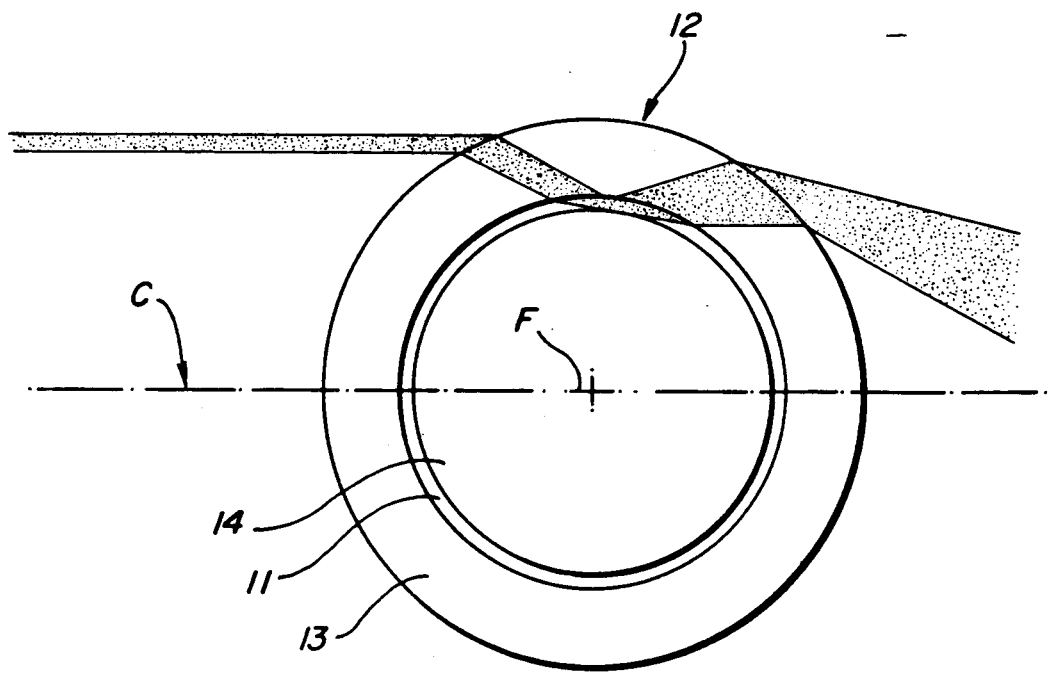
FIG-4 RAY TRACE OF LIGHT REFRACTED BY TUBE AND GAP

FIG-5 RAY TRACE OF LIGHT REFRACTED BY TUBE, GAP AND FLOAT
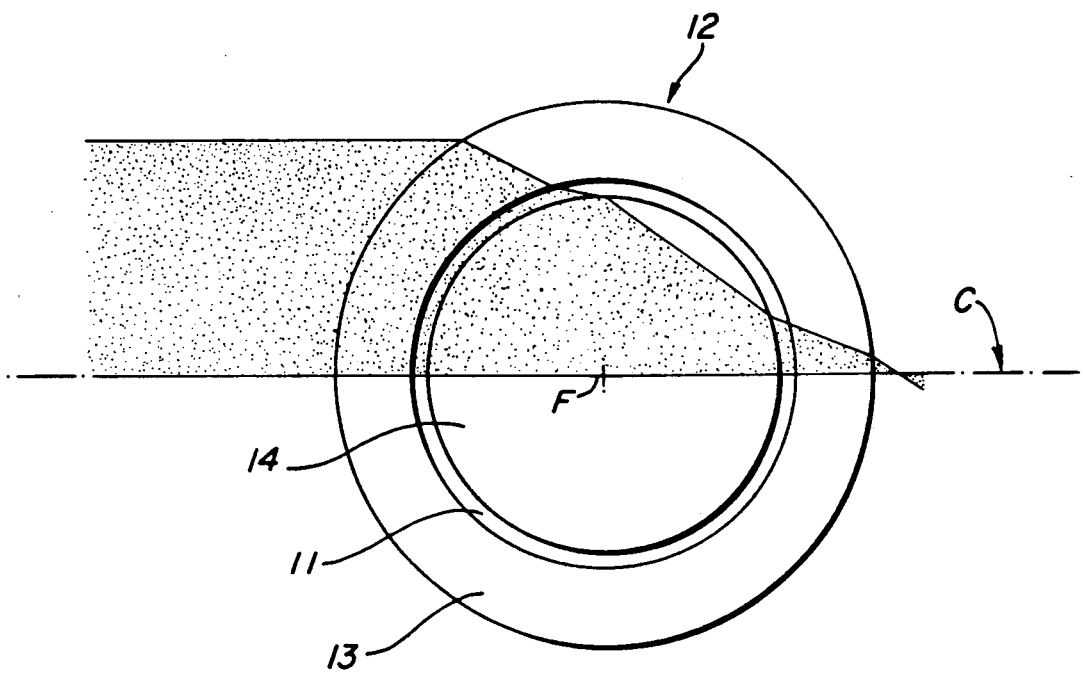
FIG-6 OVERLAY OF THREE RAY TRACES
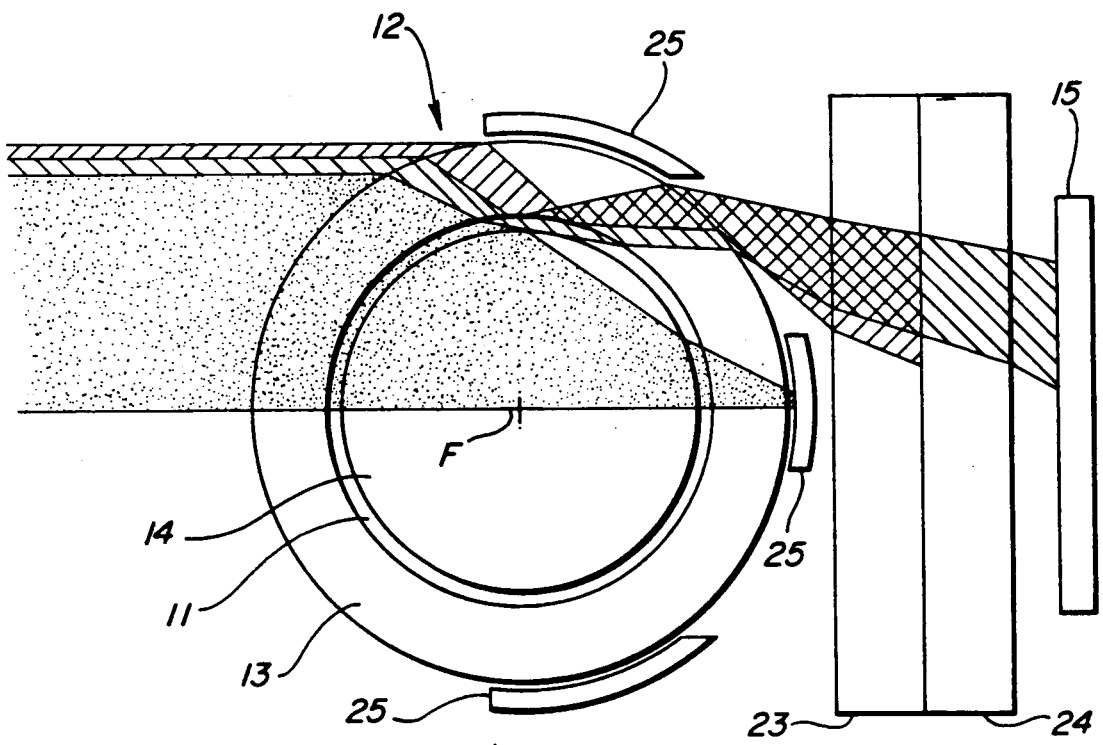

MEASURING A GAP BETWEEN A TUBE AND A FLOAT

BACKGROUND OF THE INVENTION

1. Field of the Invention.

The present invention relates to an apparatus and method for determining the radial dimension of the gap between a transparent or translucent tube and a cylindrical float located substantially coaxially within the tube. It also concerns the relationship between light from an elliptically polarized beam of light aimed normal to the axis of the tube and through the tube and gap and the consideration of polarized rays reflected and refracted by an assembly of the tube and float.

2. Background Description.

It is important to be able to measure the radial dimension of the gap between a transparent or translucent tube and a float positioned substantially coaxially within the tube in order to determine the uniformity of the gap and its radial dimension. It is particularly important that measurements be made with great accuracy and precision in order that the gap have a consistent radial dimension along the axis of the assembly and about its circumference. Uniform gap of a determined radial dimension is important to analysis of the volume and volume proportional parameters of materials in the space defined by the gap.

U.S. Pat. No. 3,994,599 shows a method and apparatus for measuring the wall thickness and concentricity of tubular glass articles. The patented method and apparatus uses a beam of coherent light directed toward the tubular glass article so that when portions of the beam are reflected by the inner and outer tube surfaces, the reflected portions converge at a point spaced from the article and the spacing is related to the wall thickness. When a plurality of such beams is directed at circumferentially spaced points, interference fringes are produced and the spacing of the fringes varies at each of the points when there is a lack of concentricity between the outer and inner surfaces of the tube. The laser beam reflections of that patent are used to measure wall thickness and not the radial dimension of the gap between a tube and a float positioned substantially concentrically in the tube. Varying wall thickness is but one factor in determining the gap at any point or at points along the axis.

U.S. Pat. No. 3,307,446 shows a light source and photo pickup used to gauge the wall thickness of glass tubing as the tubing is being drawn. Again the differences in light reflections from the inner and outer walls of the tube are measured relative to one another to give the wall thickness. This technique is based on the principle of triangulation and therefore the resolution of the measurement is limited by the spatial resolution of the detector array and the included angle between light source and detector. The light signals received in this technique are weak, being only interface reflections, and therefore the possibility of interfering signals is high. Also, this technique is not independent of index of refraction changes in the tube being measured.

It has also been known to measure holes using light sources and reflection; see, for example, U.S. Pat. Nos. 3,806,252 and 4,690,556. The latter patent shows a method for checking the straightness of an elongated generally cylindrical bore by directing a collimated light beam along the bore with the bore axis skewed slightly with respect to the beam center line. The wall of the bore reflects some of the light beam forming generally an off axis ring of reflected light beyond the end of the bore and an on-axis spot of unreflected light. Scatter of the reflected light indicates non-straightness of the reflecting bore wall. Rotation of the cylindrical bore through a plurality of positions permits checking the entire circumference.

While that method can be used to check straightness of the bore, diameter and out of roundness, that patented apparatus and method cannot be used for determinations of gap between a tube and a float positioned substantially concentrically with the tube wherein the bore is substantially filled with the float as that method requires the laser beam to be directed axially through the bore but skewed slightly relative to the axis.

Measurement of the dimension of a gap in a transparent tube with a cylindrical float is an important factor in a precision bore glass capillary tube used for scientific purposes in the analysis of blood samples in a quantitative buffy coat centrifugal analyzer. QBC ®, a product sold by Becton Dickinson and Company, Franklin Lakes, N.J., includes a capillary tube containing a solid cylindrical plastic float. A patient's blood is drawn into the tube, the tube end is sealed with a plastic cap and the tube spun in a microhematocrit centrifuge for five minutes. During centrifugation the plastic float having a specific gravity that is midway between that of the plasma and the red blood cells floats on top of the red blood cells and is surrounded by the expanded buffy coat. The float occupies more than 90% of the cross-sectional area of the tube and so the buffy coat is expanded ten-fold in the gap between the inside wall of the tube and the outside diameter of the float. The individual buffy coat layers can be easily measured. U.S. Pat. Nos. 4,567,754 and 4,190,328 disclose quantitative buffy coat tubes and the background in each patent is instructive on the procedures used to read buffy coat.

The gap between the bore of the capillary tube and the float is important in that particular application because the relative quantity of each component in the sample is a function of the gap volume or radial dimension. Therefore, the calibration of the particular tube and float used to analyze buffy coat is a primary concern. In the past tolerances in gap had to be ignored as techniques to measure the accuracy of the tubing bore diameter, usually of the finished product was the only parameter controlled during manufacture. A recent application for a patent, U.S. Ser. No. 194,614, addresses techniques for measuring and making tubing of consistent bore diameter. During manufacture the dimensions of the capillary tubing and its respective float are checked with a standard calibrating liquid to see that the spread of material captured between the inside wall of the tubing and the outside of the float was as expected. This procedure is cumbersome, slow and difficult to perform accurately. It is of value to be able to use a light source such as provided by a laser, to give an accurate reading of the inside diameter of a precision bore capillary during the tube drawing process.

SUMMARY OF THE INVENTION

The apparatus of the present invention determines the radial dimension of the gap between a transparent or translucent tube and a cylindrical float located substantially concentrically within the tube. A monochromatic light source provides an elliptically polarized light beam along an optical axis at the wavelength for which the materials of the tube and the gap are transparent or translucent. The index of refraction of the material of the tube is greater than the index of refraction of the material in the gap. A light beam focusing means positioned in alignment with the optical axis receives the polarized light beam for converting the light beam to a line of light in a plane.

Means translate and rotate an assembly of the tube and the cylindrical float through the plane with the line of light normal to a longitudinal axis of the assembly. The translation of the assembly is along the longitudinal axis while rotation of the assembly is about the longitudinal axis producing with the line of light an illumination from at least a part of the assembly in the plane. A light filtering means positioned along the optical axis beyond the assembly blocks light from the illumination reflected by the assembly and refracted by the float, the tube and the gap between the tube, and the float and transmits light from the illumination refracted by the tube and the gap between tube and float.

Light detection means positioned along the optical axis beyond the light filtering means receives light transmitted by the light filtering means. The light detection means generates signals responsive to the light received. Signal processing means, associated with said light detection means, processes signals therefrom.

The monochromatic light source may preferably be a laser diode providing a linear polarized light beam along the optical axis to a first waveplate to rotate the state of polarizations of the linear beam to elliptical and to provided an elliptically polarized beam of light. The first waveplate may preferably be a three eights waveplate and the state of the linear polarized beam is rotated forty five deqrees to form the elliptical polarized beam so that a major axis of the elliptical polarization is oriented normal to the longitudinal axis of the assembly. The light filter means may include a second waveplate along the optical axis beyond the assembly to rotate the state of polarization of the illumination. The light filtering means may in the preferred embodiment have a three-eights waveplate to rotate the state of the illumination.

The light filtering means may have therein a spacial filter to block the refracted light from the float, the tube and the gap between the tube and the float which comes to a focal point. The material of the spacial filter is most preferably non-reflecting and opaque so as to block and absorb the illumination at the focal point. The light beam focusing means is in the preferred embodiment a cylindrical lens positioned with its focusing axis coaxial to the optical axis. The signal processing means records and analyzes changes in the intensity of the light received by the light detection means.

The light beam focusing means in an alternate embodiment may include a spherical lens positioned with its focusing axis coaxial to the optical axis to first form the elliptically polarized beam of light into a spot of light in the plane and a scanning means to then reciprocate the spot of light in the plane transverse to the longitudinal axis of the assembly generating the line of light. The spot of light causes the illumination intensity to vary as a function of time so the light received by the light detection means produces a signal in the form of a pulse of increased illumination each time the spot of light scans across the gap between the tube and float. The signal processing means in the alternate embodiment records changes in the width of the pulse received by the light detection means. The scanning means reciprocates the spot of light at a frequency greater than the rate at which the means for translating and rotating rotates the assembly.

A method for determining the radial dimension of the gap between a transparent or translucent tube and a cylindrical float located substantially concentrically within the tube is also a part of this invention. The preferred method has steps including transmitting a monochromatic beam of elliptically polarized light along an optical axis to an assembly of the tube and the cylindrical float. Wherein the beam is at a wavelength for which the materials of the tube and the gap are transparent or translucent and the index of refraction of the material of the tube is greater than the index of refraction of the material in the gap. The method also has the step of focusing the beam of light along the optical axis to convert the light beam to a line of light in a plane.

The method also has the further steps of translating the assembly through the plane with the line of light normal to a longitudinal axis of the assembly and rotating the assembly about the longitudinal axis while the assembly is translating through the plane. The method has another step of producing an illumination with the line of light from at least a part of the assembly in the plane.

The next step of the preferred method is filtering the illumination from the assembly by performing the following, blocking light from the illumination reflected by the assembly and blocking light from the illumination refracted by the float, the tube and the gap between the tube and the float and transmitting the illumination refracted by the tube and the gap between the tube and the float. In the preferred method the steps of detecting the transmitted light and generating signals responsive to the light received are followed by processing the signals from the light detected. The method may have the added step of making multiple determinations of the gap circumferentially around the longitudinal axis the determinations to be used for measuring uniformity of the radial dimension of the gap.

BRIEF DESCRIPTION OF THE DRAWINGS

FIG. 2 is a schematic representation of an alternate embodiment of an apparatus similar to that shown in FIG. 1 with a change in the optics to provide a time based analysis of the radial dimension;

FIG. 3 shows an illustration of the ray trace diagram of the light which is totally internally reflected by the interface at the tube and gap;

FIG. 4 shows an illustration of the ray trace diagram of the light refracted by the tube and the gap;

FIG. 5 shows an illustration of the ray trace diagram of the light refracted by the tube, the gap and the float; and FIG. 6 is an illustration of the ray trace diagram of the light rays traced in FIGS. 3, 4 and 5 showing those traces overlayed with respect to one another.

DETAILED DESCRIPTION

Figure 1:
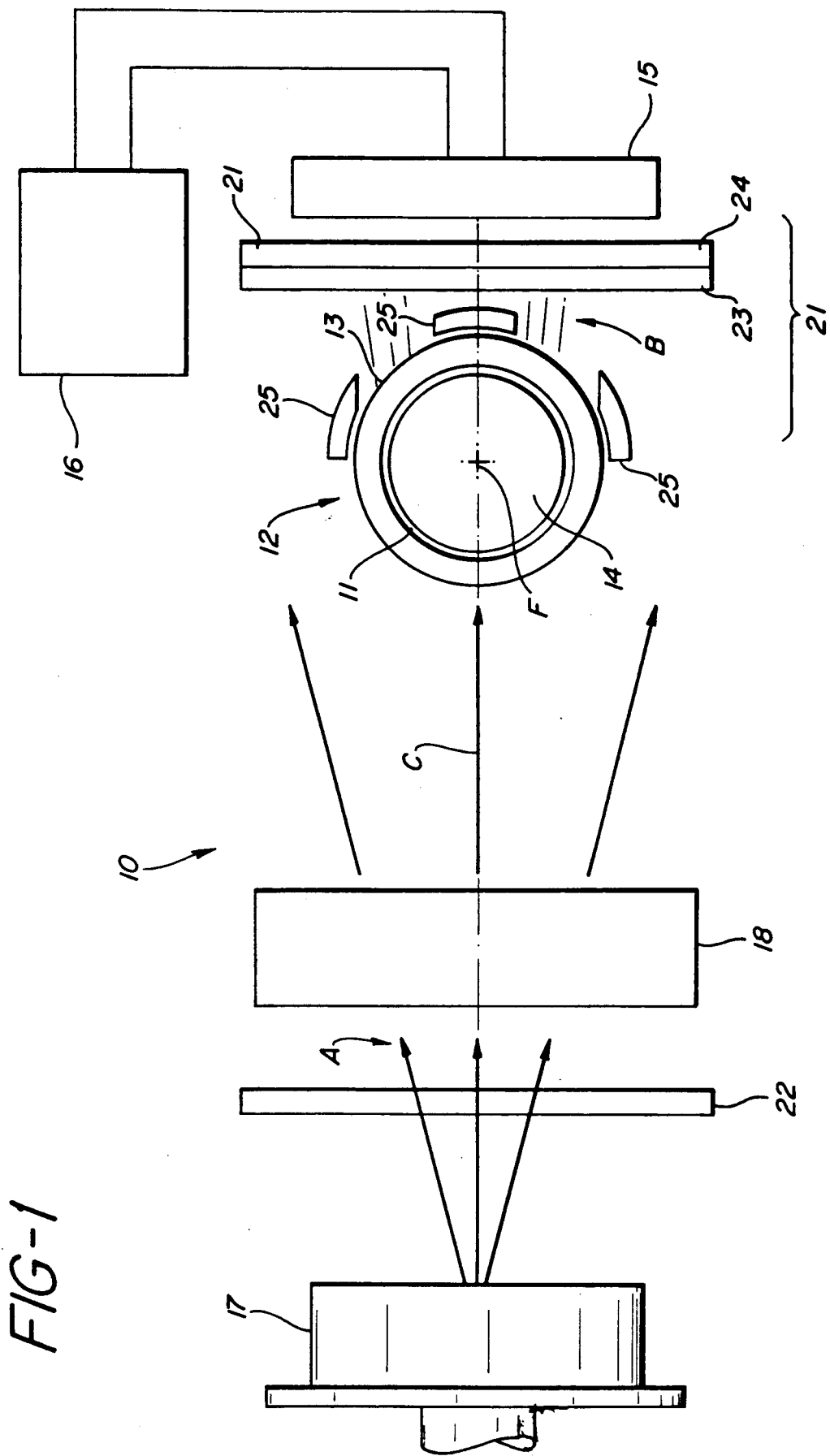
FIG. 1 is a schematic representation of a preferred apparatus for determining the gap between a tube and a cylindrical float wherein an elliptically polarized beam of light is refracted and reflected by the tube, float and gap therebetween producing an illumination which is filtered to transmit only light used for the gap determination by a detector and a signal processor.

While this invention is satisfied by embodiments in many different forms, there is shown in the drawings and will be described in detail several preferred embodiments of the invention with the understanding that the present disclosure is to be considered as exemplary of the principles of the invention and is not intended to limit the invention to the embodiments illustrated. The scope of the invention will be measured by the appended claims and their equivalents.

With the foregoing in mind FIG. 1 is a schematic illustration of a preferred apparatus 10 for determining the radial dimension of a gap 11 between an assembly 12 of a tube 13 and a cylindrical float 14 wherein an elliptically polarized beam of light "A" is refracted and reflected by the tube 13, the float 14 and the gap 11 therebetween producing an illumination designated "B" as shown in the illustrations of light ray traces in FIGS. 2, 3, 4 and 5. In particular and as will be explained in detail the tube 13, the float 14 and the gap 11 therebetween reflect and refract the beam A to produce the specific illumination B. It is the illumination B which is filtered to transmit only light used for the determination of the radial dimension of the gap 11 by a light detection means 15 and a signal processing means 16.

The apparatus 10 is aligned along an optical axis "C" so that a monochromatic light source 17 provides the elliptically polarized light beam A along the optical axis C at the wavelength for which the materials of the tube 13 and the gap 11 are transparent or translucent. The index of refraction of the material of the tube 13 is greater than the index of refraction of the material in the gap 11. A light beam focusing means 18, a cylindrical lens, positioned in alignment with the optical axis C receives the elliptically polarized light beam A for converting the light beam to a line of light "D" in a plane "E" which is the plane of the paper of FIG. 1. A means for translating and rotating 19 the assembly 12 through the plane E with the line of light D normal to a longitudinal axis "F" of the assembly 12 is indicated diagrammatically as a block in the Figures but could be a stepper motor driving an extremely fine pitch lead screw coaxially holding the assembly 12 by a collet. The means for translating and rotating 19 translates the assembly 12 along the longitudinal axis F while rotating the assembly 12 about the longitudinal axis F to produce the illumination B with the line of light D from at least a part 20 of the assembly 12 in the plane E.

A light filtering means 21 positioned along the optical axis C beyond the assembly 12 blocks light from the illumination B reflected by the assembly 12 and blocks light from the illumination B refracted by the float 14, the tube 13 and the gap 11 between the tube 13, and the float 14. The light filtering means 21 transmits light from the illumination B refracted by the tube 13 and the gap 11 between tube and float. The light detection means 15 positioned along the optical axis C beyond the light filtering means 21 receives light transmitted by the light filtering means 21. The light detection means 15 generates signals responsive to the light received and signal processing means 16 associated with the light detection means 15 processes signals therefrom. The signal processing means 16 records and analyzes changes in the intensity of the light received by the light detection means.

Since the intensity of the light striking the detection means is used to measure the radial dimension, a number of readings of the illumination B in the plane E about the rotated assembly 12 can be averaged to minimize the effect of variations in the part of the assembly 12 that is of interest. The formula to calculate the radial dimension equals a fraction times a constant used to convert the averaged intensity readings in the fraction into dimensional units such as inches. The fraction is the averaged readings of the material in the gap 11 divided by the averaged readings of the readings of the tube 13 (without the float) filled with the material in the gap 11. Specifically, averaged readings taken of the tube 13 filled with the material in the gap in a place where there is no float 14 concentrically positioned in the tube 13 compensates for intensity fluctuations and drifting not associated with the measurement of the radial dimension.

The preferred embodiment of the monochromatic light source 17 is a laser diode providing a linear polarized light beam along the optical axis C to a first waveplate 22 to rotate the state of polarization of the linear beam to elliptical and to provide the elliptically polarized beam A of light. The preferred first waveplate 22 is a three-eighths waveplate and the state of the linear polarized beam is rotated forty-five degrees to form the elliptical polarized beam A so that a major axis of the elliptical polarization is oriented normal to the longitudinal axis F of the assembly 12. A polarizer 23 as part of the light filter means 21 blocks the illumination B reflected by the assembly 12 and transmit illumination B refracted by the tube 13 and the gap 11 between the tube 13 and the float 14. The polarizer 23 is a linear polarizer. The light filter means 21 includes a second waveplate 24 along the optical axis C beyond the assembly to rotate the state of polarization of the illumination B. The preferred second waveplate 24 a three-eighths waveplate to rotate the state of the illumination.

The light filtering means 21 includes a spacial filter 25 to block the refracted light from the float 14, the tube 13 and the gap 11 between the tube 13 and the float 14 which comes to a focal point. The material of the spacial filter 25 is non-reflecting and opaque so as to block and absorb the illumination B at the focal point.

The alternate embodiment of the apparatus 10 is the same in most of the physical particulars but operates differently to the extent that the analysis of the signal generated by the light detection means 15 is time dependent instead of intensity varying. To distinguish the parts of FIG. 2 from FIG. 1 the reference numbers for the apparatus 10' of the former include a prime while the reference numbers for FIG. 1 have no prime. Those parts specifically mentioned herein in connection with the alternate all have primes and if this description of the alternate embodiment does not include the parts it is because those are the same as described for FIG. 1.

FIG. 2 is a schematic illustration of a preferred apparatus 10' for determining the radial dimension of a gap 11' between an assembly 12' of a tube 13' and a cylindrical float 14' wherein an elliptically polarized beam of light "A'" is refracted and reflected by the tube 13', the float 14' and the gap 11' therebetween producing an illumination designated "B'" as shown in the illustrations of FIGS. 3, 4, 5 and 6. As in the preferred embodiment of FIG. 1 the tube 13', the float 14' and the gap 11' therebetween reflect and refract the beam A' to produce the specific illumination B'. It is the illumination B' which is filtered to transmit only light used for the determination of the radial dimension of the gap 11' by a light detection means 15' and a signal processing means 16'. All of these components of the alternate embodiment are designed to operate on a time based analysis.

The apparatus 10' is aligned along an optical axis "C'" so that a monochromatic light source 17' provides the elliptically polarized light beam A' along the optical axis C' at the wavelength for which the materials of the tube 13' and the gap 11' are transparent or translucent. The index of refraction of the material of the tube 13' is greater than the index of refraction of the material in the gap 11'.

The light beam focusing means 18' in the apparatus 10' of the alternate embodiment, FIG. 2, is a spherical lens positioned with its focusing axis coaxial to the optical axis C'. The light beam focusing means 18' first forms the elliptically polarized beam A' of light into a spot of light in the plane E' and a scanning means 26 reciprocates the spot of light in the plane E' transverse to the longitudinal axis C' of the assembly 12' generating the line of light D'. The spot of light causes the intensity of illumination B' to vary as a function of time so the light received by the light detection means 15' produces a signal in the form of a pulse 27, shown in FIG. 2 of increased illumination each time the spot of light scans across the gap 11' between the tube 13' and float 14'. The signal processing means 16' records changes in the width of the pulse 27 received by the light detection means 15'. The scanning means 26 reciprocates the spot of light at a frequency greater than the rate at which the means for translating and rotating 19' rotates the assembly.

A light filtering means 21' positioned along the optical axis C' beyond the assembly 12' blocks light from the illumination B' reflected by the assembly 12' and blocks light from the illumination B' refracted by the float 14', the tube 13' and the gap 11' between the tube 13', and the float 14'. The light filtering means 21' transmits light from the illumination B' refracted by the tube 13' and the gap 11' between tube 13' and float 14'. The light detection means 15' positioned along the optical axis C' beyond the light filtering means 21' receives light transmitted by the light filtering means 21'. The light detection means 15' generates signals responsive to the light received and signal processing means 16' associated with the light detection means 15' processes signals therefrom. The signal processing means 16' records and analysis changes in the pulse width of the illumination pulses received by the light detection means 15'.

As with the preferred embodiment the monochromatic light source 17' is a laser diode providing a linear polarized light beam along the optical axis C' to a first waveplate 22' to rotate the state of polarization of the linear beam to elliptical and to provide the elliptically polarized beam A' of light. The preferred first waveplate 22' is a three-eights waveplate and the state of the linear polarized beam is rotated forty-five degrees to form the elliptical polarized beam A' so that a major axis of the elliptical polarization is oriented normal to the longitudinal axis F' of the assembly. A polarizer 23' as part of the light filter means 21' blocks the illumination B' reflected by the assembly 12' and transmit illumination B' refracted by the tube 13' and the gap 11' between the tube 13' and the float 14'. The polarizer 23' is a linear polarizer. The light filter means 21' includes a second waveplate 23' along the optical axis C' beyond the assembly to rotate the state of polarization of the illumination B'. The preferred second waveplate 23' a three-eights waveplate to rotate the state of the illumination.

The light filtering means 21' includes a spacial filter 25' to block the refracted light from the float 14', the tube 13' and the gap 11' between the tube 13' and the float 14' which comes to a focal point. The material of the spacial filter 25' is non-reflecting and opaque so as to block and absorb the illumination B' at the focal point.

The invention also includes a method for apparatus 10 in FIG. 1 to determine the radial dimension of the gap 11 between a transparent or translucent tube 13 and a cylindrical float 14 located substantially concentrically within the tube 13. The method has the steps of transmitting a monochromatic beam of elliptically polarized light along optical axis C to assembly 12 of the tube 13 and the cylindrical float 14, the beam A at a wavelength for which the materials of the tube 13 and the gap 11 are transparent or translucent and the index of refraction of the material of the tube 13 is greater than the index of refraction of the material in the gap 11. The next step is focusing the beam A of light along the optical axis C to convert the light beam to a line of light D in a plane E. That step is followed with the step of translating the assembly through the plane E with the line of light D normal to the longitudinal axis F of the assembly 12. After that step the steps of rotating the assembly 12 about the longitudinal axis F and translating through the plane E are performed.

The illumination B is produced in the plane with the line of light D from at least the part 20 of the assembly 12. The illumination B is filtered from the assembly 12 by blocking light from the illumination B reflected by the assembly and blocking light from the illumination B refracted by the float 14, the tube 13 and the gap 11 between the tube 13 and the float 14. The illumination B is filtered by transmitting the illumination refracted by the tube 13 and the gap 11 between the tube 13 and the float 14. Once the light is filtered the steps of detecting the transmitted light and generating signals responsive to the light received are carried out. Then the step of processing the signals from the light detected gives the radial dimension.

The theoretical basis for the invention of this specification rests on the concept that a light beam which is elliptically polarized entering any tube with a float substantially concentrically positioned therein is reflected and refracted by the tube 13, the float 14 and the material in the gap between the tube 13 and the float 14 which acts like a lens with two different focal points. The majority of rays focus just beyond the tube 13 where they can be filtered out. The rays of interest focus at another focal point which is beyond the tube 13.

The rays of interest can be used and are significant because they are not refracted by the float 14; they pass only through the gap 11. Ray trace diagrams of the different paths of the light are helpful in understanding the influence that the parts of the assembly have on the light as it passes therethrough. FIG. 3 shows an illustration of the ray trace diagram of the light which is totally internally reflected by the interface at the tube 13 and gap 11 and FIG. 4 shows an illustration of the ray trace diagram of the light refracted by the tube 13 and the gap 11. FIG. 5 shows an illustration of the ray trace diagram of the light refracted by the tube 13, the gap 11 and the float 14. In particular, if the tube 13 and the material in the gap 11 are transparent to the wavelength of the light, then the reflected and refracted light can be selectively used to determine the radial dimension of the gap 11.

The selective use of the reflected and refracted light from an assembly of the tube 13 and the substantially concentrically positioned float 14 is accomplished with a light filtering means 21 positioned along the optical axis beyond the assembly and arranged to:

(a). block light from the illumination reflected by the assembly and (b). block light from the illumination refracted by the float 14, the tube 13 and the gap 11 between the tube 13, and the float 14 and (c). transmit light from the illumination refracted by the tube 13 and the gap 11 between tube 13 and float 14.

FIG. 6 is an illustration of the ray trace diagram of the light rays traced in FIGS. 3, 4 and 5 showing those traces overlayed with respect to one another such that the filtering means functions to block all but the rays of interest.

Extrusions for the tube 13 and another for the float 14, each made with good manufacturing practices, are typically of sufficient uniformity to provide the level of tubing quality for the assembly disclosed. The level of accuracy at which the apparatus 10 and method seek to measure is such that the any defects in the tube 13 will immediately and significantly change the measured gap 11 indicating that the assembly 12 is not typical, i.e. free from manufacturing defects. The tube 13 should have relatively concentric walls that are substantially coaxial.

Accurate determination of the radial dimension of the gap 11 is useful in an instrument capable of measurement without contact with the tube 13 or float 14. Consequently, once the apparatus 10 has been calibrated and a range of acceptable values defined, the measurement of the gap 11 within the defined values can be considered correct and can be used to, for example correctly calculate the volume of the space between the tube 13 and float 14 over an axial span.

The method may be used to make multiple determinations of the gap 11 circumferentially around the longitudinal axis F so that the determinations can be used for measuring uniformity of the radial dimension of the gap 11 for each of the assemblies made in a manufacturing process. In addition the method can be used as a calibration technique to set or adjust an instrument for measuring the QBC® tubes. The table of test results which follows has data on seven sample QBC® tubes with centrifuged blood samples wherein the white blood cells (WBC) were measured relative to the platelets (PLT) and these measurements were made in the usual manner as explained herein by measuring the length of the segments or layers which represent that particular blood component. In the experiment the gap was then determined using the apparatus 10 and those gap values for each of the seven samples are given in the table.

| SAMPLE # | PLT | WBC | GAP | ADJ PLT | ADJ WBC |
|---|---|---|---|---|---|
| 1 | 217 | 4.5 | 122 | 214 | 4.43 |
| 2 | 271 | 5.3 | 103 | 225 | 4.40 |
| 3 | 248 | 5.4 | 110 | 220 | 4.79 |
| 4 | 194 | 4.1 | 139 | 217 | 4.60 |
| 5 | 216 | 4.5 | 121 | 211 | 4.39 |
| 6 | 187 | 4.3 | 128 | 193 | 4.44 |
| 7 | 166 | 3.9 | 147 | 197 | 4.62 |

The values for gap are not units of measure but represent relative numbers, i.e. the amount or index of change for the radial gap dimension. Each gap value is an indication of the change of size of the gap and therefore the thickness of the layer or segment of the component of the blood sample between the float and the tube. Use of the gap values can be made in many different ways, e.g. the average of all the gap values in the table can be calculated and the percentage of difference from the average can be determined. That percentage difference may then be used to adjust the measured reading of the WBC or PLT so those adjusted values are more accurate because gap radial dimensional changes of ten millionths of an inch can be corrected by this method and with this apparatus.

While a particular approach is described herein the apparatus described is not merely for use with QBC® tube measurements. The apparatus is for any tube and float combination with a transparent tube and gap for the wavelength of light used.

I claim:

1. An apparatus to determine the radial dimension of a gap including a material between a transparent or translucent tube and a cylindrical float located substantially concentrically within the tube comprising:

a monochromatic light source which provides an elliptically polarized light beam along an optical axis at the wavelength for which the materials of the tube and the gap are transparent or translucent and the index of refraction of the material of the tube is greater than the index of refraction of the material in the gap;

a light beam focusing means positioned in alignment with the optical axis to receive the polarized light beam for converting the light beam to a line of light in a plane;

means for translating and rotating an assembly of the tube and the cylindrical float through the plane with the line of light normal to a longitudinal axis of the assembly, the means for translating and rotating translates the assembly along the longitudinal axis while rotating the assembly about the longitudinal axis to produce an illumination with the line of light from at least a part of the assembly in the plane;

a light filtering means positioned along the optical axis beyond the assembly and arranged to, block light from the illumination reflected by the assembly and block light from the illumination refracted by the tube, the gap between the tube and the float and transmit light from the illumination refracted by the tube and the gap between tube and float;

light detection means positioned along the optical axis beyond the light filtering means to receive light transmitted by the light filtering means, the light detection means capable of generating signals responsive to the light received; and signal processing means associated with said light detection means for processing signals therefrom.

2. The apparatus of claim 1 wherein the monochromatic light source is a laser diode providing a linear polarized light beam along the optical axis to a first waveplate to rotate the state of polarization of the linear beam to elliptical and to provide an elliptically polarized beam of light.

3. The apparatus of claim 2 wherein the first waveplate is a three-eighths waveplate and the state of the linear polarized beam is rotated forty-five degrees to form the elliptical polarized beam so that a major axis of the elliptical polarization is oriented normal to the longitudinal axis of the assembly.

4. The apparatus of claim 3 wherein the light filter means includes a second waveplate along the optical axis to rotate the state of polarization of the illumination and a polarizer to block the illumination reflected by the assembly and transmit illumination refracted by the tube and the gap between the tube and the float.

5. The apparatus of claim 4 wherein the light filtering means has a three-eighths waveplate to rotate the state of the illumination and the polarizer is a linear polarizer.

6. The apparatus of claim 1 wherein the light filtering means includes a spacial filter to block the refracted light from the float, the tube and the gap between the tube and the float which comes to a focal point.

7. The apparatus of claim 6 wherein the material of the spacial filter is non-reflecting and opaque so as to block and absorb the illumination at the focal point.

8. The apparatus of claim 1 wherein the light beam focusing means is a cylindrical lens positioned with its focusing axis coaxial to the optical axis.

9. The apparatus of claim 1 wherein the signal processing means records and analysis changes in the intensity of the light received by the light detection means.

10. The apparatus of claim 1 wherein the light beam focusing means includes a spherical lens positioned with its focusing axis coaxial to the optical axis to first form the elliptically polarized beam of light into a spot of light in the plane and a scanning means to then reciprocate the spot of light in the plane transverse to the longitudinal axis of the assembly generating the line of light.

11. The apparatus of claim 10 wherein the spot of light causes the illumination intensity to vary as a function of time so the light received by the light detection means produces a signal in the form of a pulse of increased illumination each time the spot of light scans across the gap between the tube and float.

12. The apparatus of claim 11 wherein the signal processing means records changes in the width of the pulse received by the light detection means.

13. The apparatus of claim 12 wherein the scanning means reciprocates the spot of light at a frequency greater than the rate at which the means for translating and rotating rotates the assembly.

14. A method for determining the radial dimension of a gap including a material between a transparent or translucent tube and a cylindrical float located substantially concentrically within the tube having the following steps:
   transmitting a monochromatic beam of elliptically polarized light along an optical axis to an assembly of the tube and the cylindrical float, the beam at a wavelength for which the materials of the tube and the gap are transparent or translucent and the index of refraction of the material of the tube is greater than the index of refraction of the material in the gap;
   focusing the beam of light along the optical axis to convert the light beam to a line of light in a plane;
   translating the assembly through the plane with the line of light normal to a longitudinal axis of the assembly;
   rotating the assembly about the longitudinal axis while the assembly is translating through the plane;
   producing an illumination with the line of light from at least a part of the assembly in the plane;
   filtering the illumination from the assembly by,
      blocking light from the illumination reflected by the assembly and
      blocking light from the illumination refracted by the float, the tube and the gap between the tube and the float and
      transmitting the illumination refracted by the tube and the gap between the tube and the float;
   detecting the transmitted light and generating signals responsive to the light received; and
   processing the signals from the light detected.

15. The method of claim 14 including the steps of making multiple determinations of the gap circumferentially around the longitudinal axis the determinations to be used for measuring uniformity of the radial dimension of the gap.

16. An apparatus to determine the radial dimension of a gap including a material between a transparent or translucent tube and a cylindrical float located substantially concentrically within the tube comprising:
   a laser diode and 3/8 waveplate which provides an elliptically polarized light beam along an optical axis at the wavelength for which the materials of the tube and the gap are transparent or translucent and the index of refraction of the material of the tube is greater than the index of refraction of the material in the gap;
   a spherical lens positioned in alignment with the optical axis to receive the polarized light beam for converting the light beam to a line of light in a plane;
   means for translating and rotating an assembly of the tube and the cylindrical float through the plane with the line of light normal to a longitudinal axis of the assembly, the means for translating and rotating translates the assembly along the longitudinal axis while rotating the assembly about the longitudinal axis to produce an illumination with the line of light from at least a part of the assembly in the plane;
   a spacial filter and a polarizer positioned along the optical axis beyond the assembly and arranged to, block light from the illumination reflected by the assembly and block light from the illumination refracted by the tube, the gap between the tube and the float and transmit light from the illumination refracted by the tube and the gap between tube and float;
   light detection means positioned along the optical axis beyond the spacial filter and the polarizer to receive light transmitted thereby, the light detection means capable of generating signals responsive to the light received; and
   signal processing means associated with said light detection means for processing signals therefrom.

17. The apparatus of claim 16 wherein the illumination passing through the assembly produces to focal points each beyond the assembly and the spacial filter and the polarizer block the focal point just beyond the assembly and transmit the focal point significantly beyond the assembly.

* * * * *